US010043359B2

(12) United States Patent
Takiguchi et al.

(10) Patent No.: US 10,043,359 B2
(45) Date of Patent: Aug. 7, 2018

(54) APPARATUS AND METHOD OF MONITORING MOVING OBJECTS

(71) Applicants: DENSO CORPORATION, Kariya, Aichi (JP); DENSO WAVE INCORPORATED, Chita-gun, Aichi (JP)

(72) Inventors: Masahiro Takiguchi, Anjo (JP); Tetsuya Iwasaki, Tokyo (JP); Kenji Tsubone, Fukuoka (JP)

(73) Assignees: DENSO WAVE INCORPORATED, Aichi-Pref. (JP); DENSO CORPORATION, Kariya (JP)

( * ) Notice: Subject to any disclaimer, the term of this patent is extended or adjusted under 35 U.S.C. 154(b) by 59 days.

(21) Appl. No.: 14/773,613

(22) PCT Filed: Mar. 10, 2014

(86) PCT No.: PCT/JP2014/056184
§ 371 (c)(1),
(2) Date: Sep. 8, 2015

(87) PCT Pub. No.: WO2014/136979
PCT Pub. Date: Sep. 12, 2014

(65) Prior Publication Data
US 2016/0042622 A1    Feb. 11, 2016

(30) Foreign Application Priority Data

Mar. 8, 2013   (JP) ................................. 2013-046600
Mar. 8, 2013   (JP) ................................. 2013-046602

(51) Int. Cl.
*G08B 13/196*   (2006.01)
*G06T 7/20*     (2017.01)
(Continued)

(52) U.S. Cl.
CPC ...... *G08B 13/19608* (2013.01); *G01S 3/7864* (2013.01); *G01S 17/42* (2013.01);
(Continued)

(58) Field of Classification Search
CPC ................................................ G08B 13/19608
See application file for complete search history.

(56) References Cited

U.S. PATENT DOCUMENTS 7,489,334 B1 *   2/2009   Pickering ........... G06K 9/00771
                                                      348/155
7,868,814 B1 *   1/2011   Bergman ................ G01S 7/003
                                                      340/945
(Continued)

FOREIGN PATENT DOCUMENTS

JP       S63-284990 A    11/1988
JP       3011121 B2      2/2000
(Continued)

OTHER PUBLICATIONS

May 20, 2014 International Search Report issued in International Patent Application No. PCT/JP2014/056184.
(Continued)

*Primary Examiner* — Jonathan Messmore
(74) *Attorney, Agent, or Firm* — Oliff PLC

(57) ABSTRACT

A monitoring area is scanned by an area sensor device (e.g., an optical distance meter) detects objects. Moving objects are identified among the detected objects, and, among the identified moving objects, a moving object which is present in the monitoring area and which has been newest identified is set as a tracking target. The moving object which has been set at the tracking target is automatically tracked by a camera device. As a result, even if there are present a plurality of moving objects in the monitoring area, tracking targets can be switched from one to another, so that it is possible to (Continued)

US 10,043,359 B2

Page 2 designate, as a tracking target, a moving object desired by an observer.

8 Claims, 12 Drawing Sheets

(51) Int. Cl.
 *G01S 3/786* (2006.01)
 *G01S 17/42* (2006.01)
(52) U.S. Cl.
 CPC ...... *G06T 7/20* (2013.01); *G06T 2207/10016* (2013.01); *G06T 2207/10028* (2013.01); *G06T 2207/30196* (2013.01)

(56) References Cited

U.S. PATENT DOCUMENTS

| | | | |
|---|---|---|---|
| 2001/0019357 A1 | 9/2001 | Ito et al. | |
| 2004/0175019 A1* | 9/2004 | Howard | G06K 9/0063 382/103 |
| 2005/0275721 A1* | 12/2005 | Ishii | G08B 13/19608 348/159 |
| 2006/0012681 A1 | 1/2006 | Fujii | |
| 2007/0229663 A1* | 10/2007 | Aoto | G06K 9/00335 348/155 |
| 2011/0310219 A1 | 12/2011 | Kim et al. | |
| 2013/0229563 A1 | 9/2013 | Ogino | |

FOREIGN PATENT DOCUMENTS

| | | |
|---|---|---|
| JP | 2001-319279 A | 11/2001 |
| JP | 2006-229321 A | 8/2006 |
| JP | 2009-273006 A | 11/2009 |
| JP | 2010-237132 A | 10/2010 |
| JP | 2011-258031 A | 12/2011 |
| JP | 2012-033053 A | 2/2012 |
| JP | 2012-103809 A | 5/2012 |
| JP | 2012-109733 A | 6/2012 |
| JP | 2012-129689 A | 7/2012 |

OTHER PUBLICATIONS

Sep. 8, 2015 International Preliminary Report on Patentability issued in International Patent Application No. PCT/JP2014/056184.

* cited by examiner

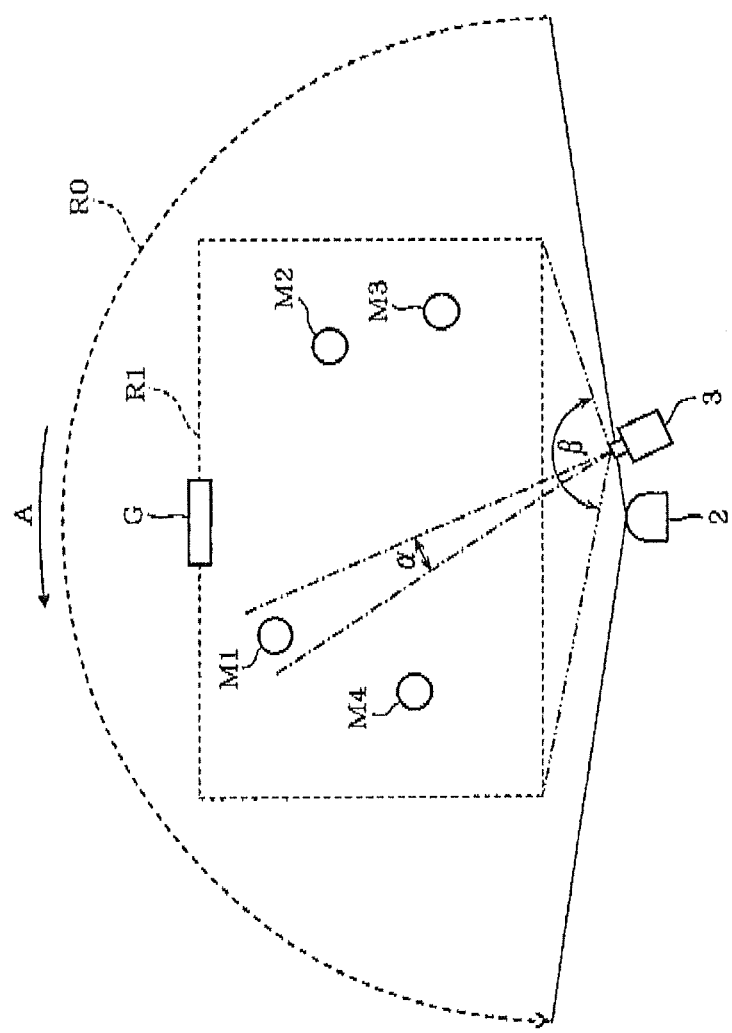

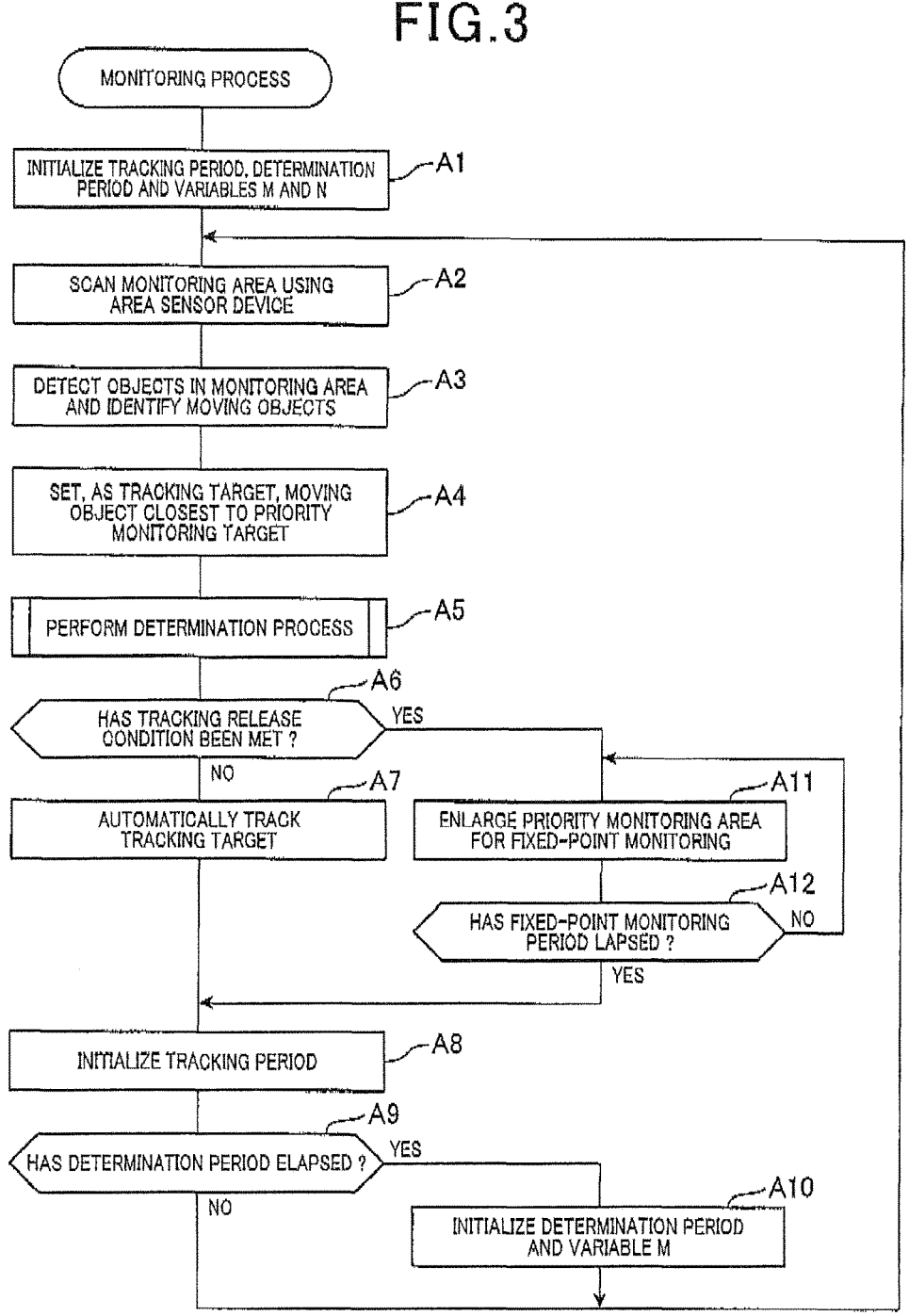

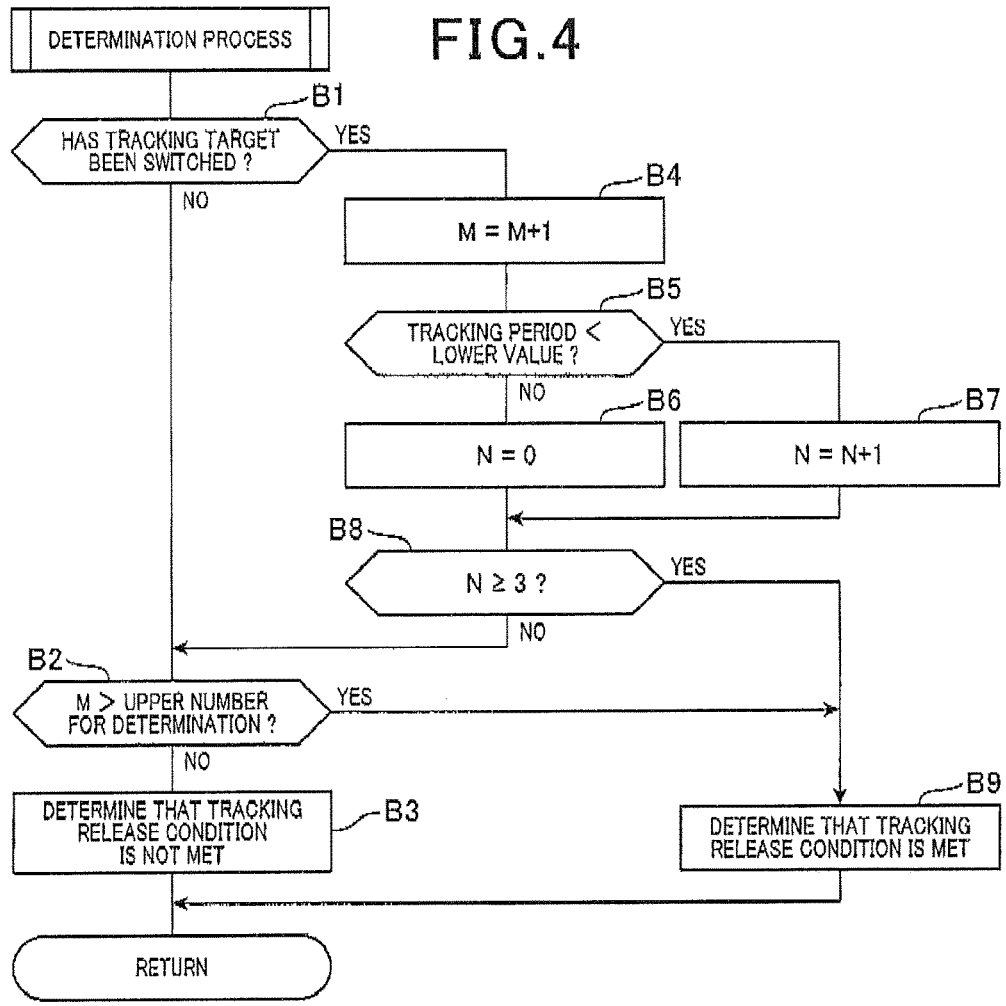
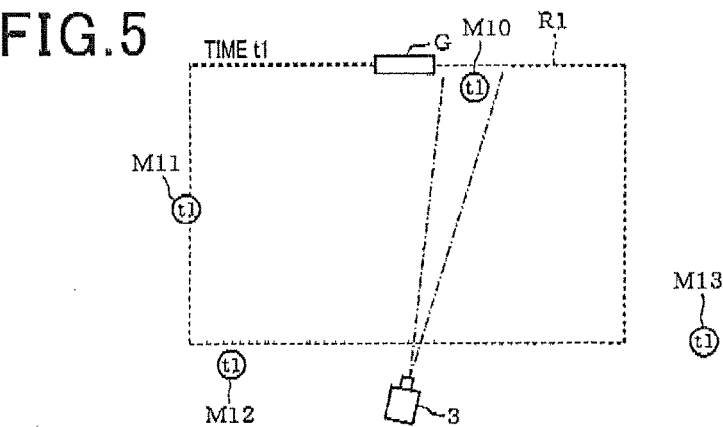

APPARATUS AND METHOD OF MONITORING MOVING OBJECTS

CROSS-REFERENCE TO RELATED APPLICATIONS

This application is a national stage of PCT/JP2014/056184 filed Mar. 10, 2014 which claims the benefit of priority from earlier Japanese Patent Applications No. 2013-046600 filed Mar. 8, 2013 and No. 2013-046602 filed Mar. 8, 2013. The entire contents of the prior applications are hereby incorporated by reference herein in their entirety.

TECHNICAL FIELD

The present invention relates to an apparatus and method of monitoring a moving object by automatically tracking the moving object within a monitoring area.

BACKGROUND ART

There has been known a system that detects a moving object and continuously images the detected moving object. In this system, an area sensor device such as a laser distance meter is used to scan a monitoring area to detect a moving object and a camera device is used so as to track the detected moving object so that the moving object is continuously imaged. For example, Patent Literature 1 discloses a security system that turns a camera device so as to track an intruder, during which image data monitoring the intruder are obtained.

CITATION LIST

Patent Literature

[PTL 1] JP Patent No. 3011121

SUMMARY OF INVENTION

Technical Problem

Conventionally, it is general that the monitoring area is set to have a certain level of wide which can be covered by a photographable range of a camera device incorporated in the system. When the camera device operates to cover the whole monitoring area, it is often difficult to image, in a distinguishable manner, each moving object present in the area. Nonetheless, it is required that the monitoring apparatus monitors all moving objects which are present in the monitoring area, without failure. For this reason, if a plurality of moving objects are detected at the same time, it is required to select a moving object among the plurality of moving objects and switch over moving objects being tracked.

However, in system shown in the foregoing Patent Literature 1, since it is not assumed that there are present a plurality of moving objects at the same time, the system cannot select and set a moving object being tracked. In addition, the system cannot switch over moving objects from one to another to track such objects. In this system, it can be easily conceived of successively switch over objects being tracked. However, simply switching over such objects may cause a state where an object desired by an observer is not tracked. In this case, a purpose given to the monitoring apparatus, that is automatic tracking of moving objects in such a manner that the moving objects are tracked independently of each other, may not be realized sufficiently.

Simple switchovers among the objects being tracked may fail to reliably track all the moving objects present in the monitoring area at the same time, which might also be led to an insufficient monitoring performance (i.e., a decrease of monitoring performance).

The present invention has been made with consideration of the foregoing situations, and it is a first object to provide an apparatus and a method of monitoring moving objects, in which the apparatus and method are able to switch objects being tracked from one to another, and set an observer's concerned moving object to a tracking target, even if there are a plurality of moving objects in a monitoring area at the same time.

The present invention has been made with consideration of the foregoing situations, and it is a second object to provide an apparatus and a method of monitoring moving objects, in which the apparatus and method are able to prevent their monitoring performance from being lowered even if there are a plurality of moving objects in the monitoring area at the same time.

Solution to Problem

In order to accomplish the first object, one aspect of the present invention provides an apparatus and method of monitoring moving objects. In the apparatus and method, a monitoring area is scanned by an optical distance meter to detect objects, moving objects are identified among the detected objects, a moving object which is present in the monitoring area and which has been newest identified is set as a tracking target, and the moving object designated as the tracking target is automatically tracked by a camera device. Hence, at a moment when a moving object enters the monitoring area, the moving object can be designated as a tracking target.

Since the monitoring area is set to have a certain degree of size as referred above, a probability that a plurality of moving objects are present in the monitoring area at the same time becomes higher. In this case, when a single moving object is automatically tracked during which movements of the tracked moving objects are checked with enlarged images, other moving objects are not monitored. Hence, in such a situation, it is quite difficult to monitor in parallel all the moving objects without fail.

Hence, with consideration for the fact that moving objects do not appear suddenly in a monitoring area but enter the monitoring area via the border of the monitoring area, a moving object newest identified in the monitoring area is designated as a tracking target. This makes it possible to designate all the moving objects as tracking targets by turns. As a result, a moving object which has just entered the monitoring area R1, i.e., a moving object desired by an observer to be monitored can be set as a tracking target. In this configuration, every time a moving object is newly identified, the tracking target is set, whereby tracking targets are switched from one to another by turns depending on movements of the moving objects. It is thus possible to monitor moving objects which are present in the monitoring area.

In addition, in order to accomplish the second object, a second aspect of the present invention provides a method of monitoring moving objects. According to this method, in a monitoring apparatus, a monitoring area is scanned by an optical distance meter to detect objects, moving objects are identified among the detected objects, the identified moving objects are set to tracking targets, the tracking targets are automatically tracked by a camera device. In this configuration, when it is identified that a plurality of moving objects are present in the monitoring area, it is then determined whether or not a tracking release condition, which is set to release the automatic tracking, is met. When it is determined that a plurality of moving objects are present in the monitoring area and the tracking release condition is met, a priority monitoring area, which is preset to include a priority monitoring object in the monitoring area, is enlarged in view by a camera device and subjected to fixed-point monitoring performed by the camera device.

Since the monitoring area is set to have a certain degree of size as referred above, a probability that a plurality of moving objects are present in the monitoring area at the same time becomes higher. In this case, when a single moving object is automatically tracked during which movements of the tracked moving objects are checked with enlarged images, other moving objects are not monitored. Hence, in such a situation, it is quite difficult to monitor in parallel all the moving objects without fail.

With consideration of such a difficulty, the priority monitoring area is monitored in a fixed-point monitoring manner in cases where a plurality of moving objects are identified, thus making it possible to know, at least, how the moving objects move in the priority monitoring area. In consequence, if there are a plurality of moving objects in the monitoring area, moving objects which are present closely to the priority monitoring object can be discriminated from the remaining, thus preventing a decrease of monitoring performance in an area which should be monitored with priority.

BRIEF DESCRIPTION OF DRAWINGS

In the accompanying drawings:

FIG. 2 is an illustration illustrating a mentoring area which is an area being monitored by the monitoring apparatus;

FIG. 3 is a flowchart showing a monitoring process performed by the monitoring apparatus;

FIG. 4 is a flowchart showing a determination process performed by the monitoring apparatus;

FIG. 5 is an illustration illustrating a positional relationship among moving objects at a time instant t1;

FIG. 19 is a flowchart showing a monitoring process performed by a monitoring apparatus according to a second embodiment;

DESCRIPTION OF EMBODIMENTS

Figure 1:
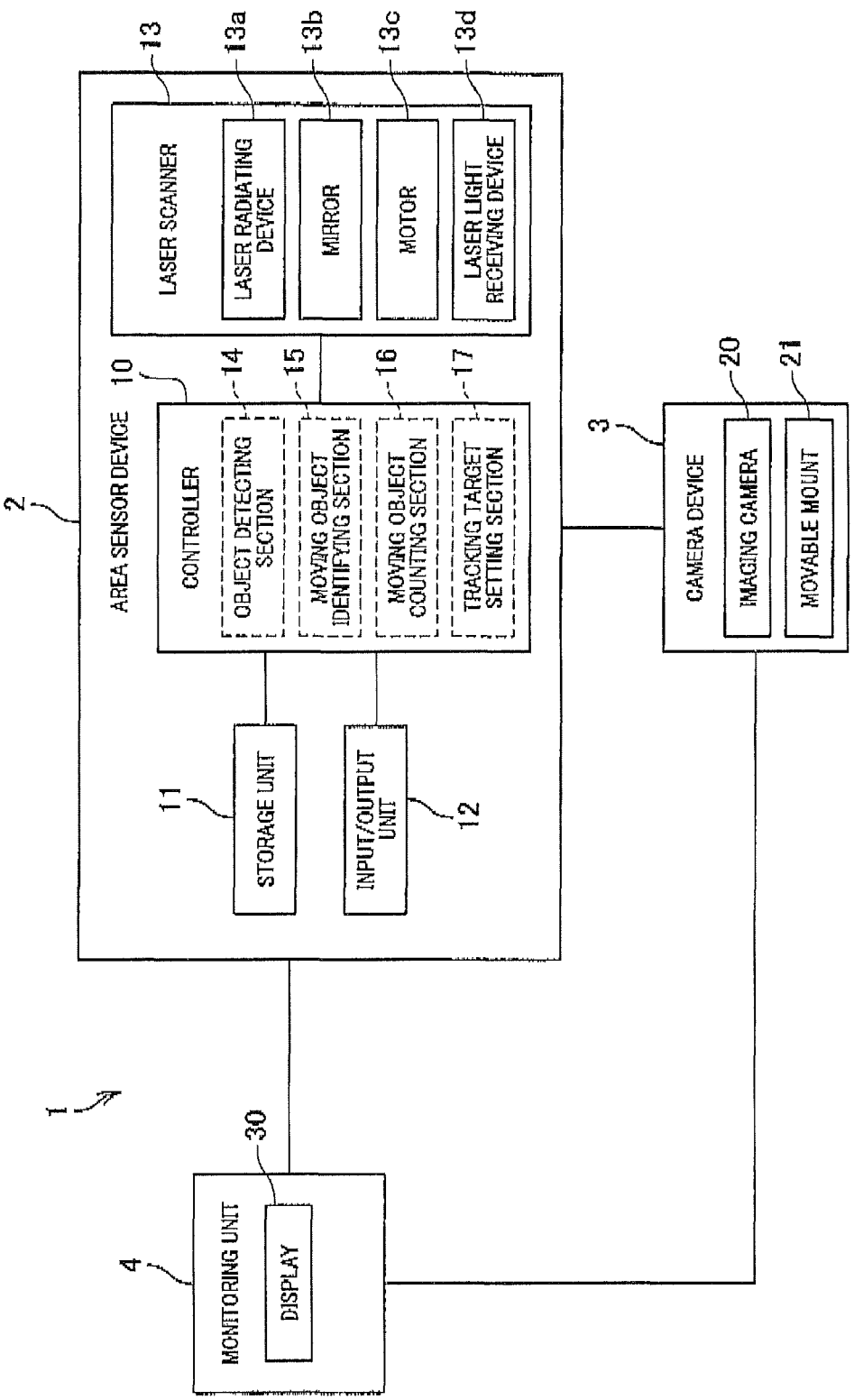
FIG. 1 is a block diagram illustrating the configuration of a monitoring apparatus according to a first embodiment.

Referring now to the accompanying drawings, various embodiments of the present invention will now be described. In the respective embodiments, components which are substantially in common are given the same reference numerals so that redundant explanations are omitted.

[First Embodiment]

With reference to FIGS. 1 to 9, a first embodiment of the present invention will now be described.

As shown in FIG. 1, there is provided a monitoring apparatus that adopts a control method of the present embodiment, in which the monitoring apparatus 1 is provided with an area sensor device 2, a camera device 3, and a monitoring unit 4.

As shown in FIG. 1, the area sensor device 2 includes a controller 10, a storage unit 11, an input/output unit 12, a laser scanner 13, an object detecting section 14, a moving object identifying section 15, a moving object counting section 16, a tracking target setting section 17, and other necessary components. The controller 10 is configured by a microcomputer that has a central processing unit (CPU), a read-only memory (ROM), a random access memory (ROM), and the like (not shown). The controller 10 controls the laser scanner 13 and the like by running computer programs stored in the storage unit 11 and the like. According to the present embodiment, the object detecting section 14, the moving object identifying section 15, the moving object counting so section 16, and the tracking target setting section 17 are actualized as software by the computer programs run by the controller 10. The area sensor device 2 corresponds to an optical distance meter in the scope of claims.

The storage unit 11 is configured by a memory device or the like (not shown). The storage unit 11 stores therein various types of information such as computer programs, as well as measurement results such as the detection distance and the detection angle of a detected object. The input/output unit 12 functions as an input and output means for receiving input of command signals from high-order control devices (not shown), outputting notifications of detection results regarding objects, and the like.

The laser scanner 13 includes a laser radiating device 13a, a mirror 13b, a motor 13c, and a laser light receiving device 13d. The mirror 13b reflects laser light irradiated from the laser radiating device 13a towards a monitoring area and receives light reflected by an object within the monitoring area. The motor 13c rotatably drives the mirror 13b at an angular resolution and a scanning cycle determined in advance. The laser light receiving device 13d receives the reflected light. This configuration is an example. A configuration that drives the laser radiating device 13a (a configuration in which the reflection mirror 13b is not used during radiation) is also possible. As a result of the laser radiating device 13a irradiating laser light and the motor 13c rotatably driving the mirror 13b, the laser light is irradiated within a scanning area R0 in a predetermined scanning direction, such as that indicated by arrow A (a counter-clockwise direction from a planar perspective in FIG. 2). The reflected light that is reflected by a moving object (such as a moving object M1 in FIG. 2) present within the scanning area R0 is received by the laser light receiving device 13d.

The object detecting section 14 detects an object, as is well known, based on the distance (above-described detection distance) and the scanning angle (above-described detection angle) when the reflected light is received by the laser light receiving device 13d. The moving object identifying section 15 identifies whether or not the object is a moving object based on changes over time. The changes over time refer to the changes in the detection distance and the detection angle corresponding to the detected object over a plurality of scanning operations.

The moving object counting section 16 identifies the number of moving objects identified by the moving object identifying section 15. The tracking target setting section 17 sets any of the moving objects, when a plurality of moving objects are identified, as a tracking target (i.e., a target being tracked). According to the present embodiment, the tracking target setting section 17 sets, as the tracking target, the moving object closest to a priority monitoring target, among the plurality of moving objects. The priority monitoring target is set within a monitoring area R1 (an entrance/exit G, according to the present embodiment). Position information on the moving object set as the tracking target (i.e., the target which should be tracked) is transmitted to the camera device 3. The position information includes the distance to the moving object determined from the detection distance, and an angle determined from the detection angle.

The camera device 3 includes an imaging camera 20 and a movable mount 21. As shown in FIG. 2, the imaging camera 20 is provided with a so-called zoom function that allows the angle of view (field of view) to be changed from an angle of view α to an angle of view β. At the angle of view α, an image in which the moving object is identifiable can be captured. At the angle of view β, the overall monitoring area R1 is captured. Here, "the moving object is identifiable" means that, if the moving object is a person, for example, the face can be recognized. If the moving object is a vehicle, the vehicle model, the license plate, the face of the driver, or the like can be recognized.

Therefore, when an image is captured at the angle of view α, for example, the face of a person can be recognized from the captured image (including still image and video image). Meanwhile, when an image is captured at the angle of view β, identification of individual moving objects (such as recognition of the face of a person) is slightly difficult. However, at least the presence of the moving object can be grasped. Furthermore, for example, the outer appearance of the moving object can be roughly recognized.

The imaging camera 20 is attached to the movable mount 21. The imaging camera 20 is aimed towards the direction in which the moving object set as the tracking target is present, based on the position information of the moving object acquired from the area sensor device 2. In addition, zoom function control of the imaging camera 20 is performed. The direction of the imaging camera 20 and the zoom function are controlled each time the position of the moving object changes. Tracking the movement of the moving object and capturing an image of the moving object in this way corresponds to automatic tracking.

The monitoring unit 4 includes a display 30. The monitoring unit 4 displays the image captured by the camera device 3. The monitoring unit 4 is provided in a security room (not shown), for example, and is monitored by a security guard or the like.

Next, a control method for performing automatic tracking of a moving object will be described.

The monitoring apparatus 1 performs a monitoring process shown in FIG. 3. When the monitoring process is started, first, the monitoring apparatus 1 initializes a tracking period, a determination period, and variables M and N (A1). Although details will be described hereafter, the definition of each field is as follows, Tracking period: The tracking period refers to a period from when the tracking target is set until the next tracking target is set. That is, the tracking period refers to the period until the tracking target is switched. The tracking period corresponds to a "period during which the same moving object is automatically tracked". The tracking period includes a period during which the direction of the imaging camera 20 is changed and a period during which the zoom function is controlled.

Determination period: The determination period is set in advance.

Variable M: The variable M is used to count the number of times the tracking target is switched during the determination period. As described hereafter, when the value of the variable M exceeds a determination upper-limit count determined in advance, a determination is made that the field of view of the imaging camera 20 is frequently switched.

Variable N: The variable N is used to count the number of times the tracking period falls below a lower limit value. As described hereafter, when the value of the variable N reaches a lower-limit determination count (three times according to the present embodiment) or higher, a determination is made that the field of view of the imaging camera 20 is frequently switched in a state in which the moving object cannot be identified. The lower limit value is set taking into consideration the period during which the direction of the imaging camera 20 is changed, the period during which the zoom function is controlled, and a period that is expected to be required to identify a moving object from an image (such as a period required for the security guard to recognize the face of a person).

Next, the monitoring apparatus 1 scans the monitoring area R1 using the area sensor device 2 (A2). The monitoring apparatus 1 thereby detects objects within the monitoring area R1 and identifies moving objects (A3). The monitoring apparatus 1 sets the moving object closest to the priority monitoring target (the entrance/exit G) as the tracking target (A4). At this time, when a plurality of moving objects M10 and M11 are identified within the monitoring area R1 (including the region) at time t1, as shown in FIG. 5, the monitoring apparatus 1 automatically tracks the moving object M10 closest to the entrance/exit G. FIG. 5 schematically indicates the moving object with the symbol (circle). The time at which the moving object is identified is indicated by characters ("t1" in FIG. 5) inside the symbol. This similarly applies to FIG. 6, FIG. 7, and the like, described hereafter.

In other words, the monitoring apparatus 1 sets the tracking target giving preference to the moving object closest to the priority monitoring target. As a result, the monitoring apparatus 1 sets the desired moving object that an observer, such as the security guard, should monitor as the tracking target. At step A4, when a single moving object is identified, this moving object is set as the tracking target, as the moving object closest to the entrance/exit G.

After setting the tracking target, the monitoring apparatus 1 performs a determination process (A5). In the determination process, as described hereafter, the monitoring apparatus 1 determines whether or not a tracking release condition has been met, based on the frequency of switching of the tracking target. The tracking release condition is used to release automatic tracking. A reason for this is that, when the tracking target is frequently switched, identification of the moving object becomes difficult because the field of view of the camera device 1 is also frequently switched. Therefore, in the determination process, the monitoring apparatus 1 determines whether or not to release automatic tracking.

At this time, the monitoring apparatus 1 determines the frequency of tracking target switching based on the following the tracking target is switched during the determination period determined in advance exceeds the determination upper-limit count.

Determination criterion B: The consecutive number of times that the tracking period during which the same moving object is automatically tracked falls below the lower limit value is the lower-limit determination count or more. According to the present embodiment, whether or not the tracking period consecutively falls below the lower limit value three times is determined.

The determination process is performed as a part of the monitoring process flow, as shown in FIG. 3. However, to simplify the description, the flow of the processes for the determination criterion A and the determination criterion B will be collectively described herein.

<Regarding Determination Criterion A>

In the determination process, the monitoring apparatus 1 determines whether or not the tracking target has been switched (B1). When determined that the tracking target has not been switched (NO at B1), the monitoring apparatus 1 determines whether or not the variable M has exceeded the determination upper-limit count (B2). The monitoring apparatus 1 increments the variable M each time the tracking target is switched during a predetermined period (YES at B1, B4). Meanwhile, the monitoring apparatus 1 initializes the variable M after the elapse of the determination period (YES at step A9, A10 in FIG. 3). Therefore, the number of times (i.e., count) the tracking target has been switched, that is, the number of times the field of view of the imaging camera 20 has been switched can be grasped the value of the variable M being referenced.

When determined that the variable M has exceeded the determination upper-limit count (YES at B2), the monitoring apparatus 1 considers the field of view of the imaging camera 20 to be frequently switched, and determines that the tracking release condition for releasing automatic tracking is met (B9). Meanwhile, when determined that the variable M has not exceeded the determination upper-limit count (NO at B2), the monitoring apparatus 1 considers the field of view of the imaging camera 20 to not be frequently switched, and determines that the tracking release condition is not met (63). In this way, the monitoring apparatus 1 determines whether or not to release automatic tracking based on the determination criterion A.

<Regarding Betermination Criterion B>

When determined that the tracking target has been switched (YES at B1), after incrementing the above-described variable M (B4), the monitoring apparatus 1 determines whether or not the tracking period falls below the lower limit value (55). The monitoring apparatus 1 initializes the tracking period each time automatic tracking is started (step A8 in FIG. 3). The tracking period refers to the period elapsed from when the moving object set as the tracking target has previously been automatically tracked until the current point in time (the period during which the same moving object is automatically tracked).

When determined that the tracking period has not fallen below the lower limit value (NO at B5), the monitoring apparatus 1 considers the previous automatic tracking to have been performed over the period required for identifying the moving object and sets the variable N to 0 (B6). Meanwhile, when determined that the tracking period falls below the lower limit value (YES at B5), the monitoring apparatus 1 considers the previous automatic tracking to not have been performed over the period required for identifying the moving object, and increments the variable N (B7).

After repeatedly performing the determination process, when determined that the state in which the tracking period falls below the lower limit value (the state in which the variable N is not set to 0) continuously occurs and the variable N becomes three (lower-limit determination count) or more (YES at B8), the monitoring apparatus 1 considers that a period sufficient for identifying a moving object is not secured. The monitoring apparatus 1 determines that the tracking release condition for releasing automatic tracking is met (B9). When determined that the variable N is less than three (NO at B8), the monitoring apparatus 1 proceeds to step B2.

In this way, the monitoring apparatus 1 determines whether or not to release automatic tracking in the determination process. The monitoring apparatus returns to the monitoring process based on the determination result.

After returning from the determination process, the monitoring apparatus 1 determines whether or not the tracking release condition is met (A6). When determined that the tracking release condition is not met (NO at A6), the monitoring apparatus 1 automatically tracks the tracking target set at step A4 (A7). The monitoring apparatus 1 initializes the tracking period (A8). Then, when determined that the determination period has elapsed (YES at A9), the monitoring apparatus 1 initializes the determination period and the variable M (A10). The monitoring apparatus 1 then proceeds to step A2. Meanwhile, when determined that the determination period has not elapsed (NO at A9), the monitoring apparatus 1 directly proceeds to step A2).

Figure 6:
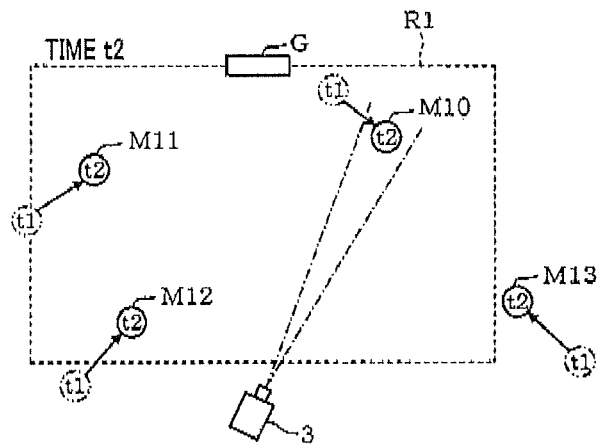
FIG. 6 is an illustration illustrating a positional relationship among the moving objects at a time instant t2.

When the state at time t1 shown in FIG. 5 changes to the state at time t2 shown in FIG. 6, a plurality of moving objects M10, M11, and M12 are identified within the monitoring area R1 (including the region). Therefore, the monitoring apparatus 1 sets the moving object (the moving object M10 in this case as well) closest to the entrance/exit G as the tracking target and starts automatic tracking. In this case, the moving object M10 is continuously automatically tracked from the state at time t1. Therefore, in the determination process described above, the monitoring apparatus 1 determines that the tracking target is not switched.

Figure 7:
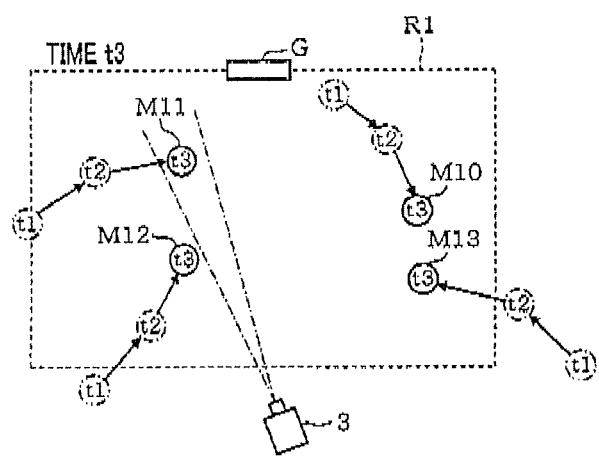
FIG. 7 is an illustration illustrating a positional relationship among the moving objects at a time instant t3.

Then, when a plurality of moving objects M10, M11, M12, and M13 are identified within the monitoring area R1 (including the region) at time t3 as shown in FIG. 7, the monitoring apparatus 1 sets the moving object (the moving object M11 in this case) closest to the entrance/exit G as the tracking target and starts automatic tracking. In this case, in the determination process, the monitoring apparatus 1 determines whether or not the tracking period falls below the lower limit value because the tracking target is switched.

Figure 8:
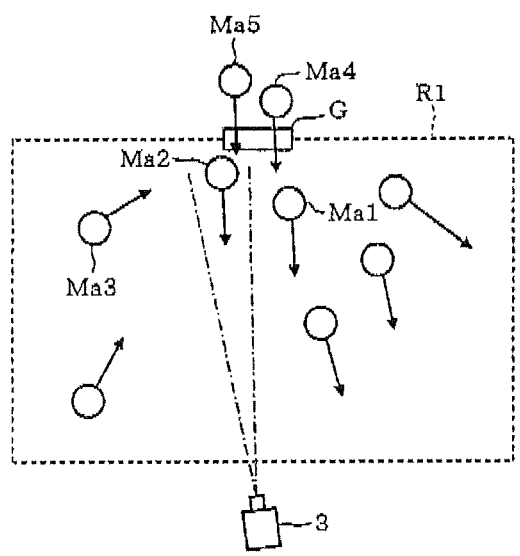
FIG. 8 is an illustration illustrating a positional relationship among the moving objects in the monitoring area.

For example, a situation is premised such as that shown in FIG. 8. Here, a plurality of moving objects are identified within the monitoring area R1 and the movable objects move during a short period of time. This situation corresponds, for example, to a situation in which the moving objects (such as people) enter and exit the entrance/exit G during a short period of time, such as at the start or end of the work day.

In this case, the monitoring apparatus 1 sets the moving object closest to the entrance/exit G as the tracking target. Therefore, the monitoring apparatus 1 initially automatically tracks a moving object Ma1. When the moving object Ma1 moves and a moving object Ma2 newly becomes closest to the entrance/exit G, the monitoring apparatus 1 automatically tracks the moving object Mat, as shown in FIG. 8. Furthermore, when time elapses and, for example, a moving object Ma4 newly infiltrates the monitoring area R1 and becomes closest to the entrance/exit G, the monitoring apparatus 1 sets the moving object Ma4 as the tracking target.

Therefore, in a situation in which the moving objects concentrate near the entrance/exit G during a short period of time and the moving object closest to the entrance/exit G frequently changes, the field of view of the imaging camera 20 is frequently switched when the tracking target is automatically tracked. Identification performance for the moving object decreases. In other words, monitoring may become insufficient.

When the moving object closest to the entrance/exit G frequently changes in this way, the tracking target is frequently switched during the determination period. Instances in which the tracking period continuously falls below the lower limit value increases. In other words, in the state shown in FIG. 8, the likelihood of the above-described determination criterion A or determination criterion B being met increases. When the determination criterion A or the determination criterion B is met (YES at step B2 or YES at step B8, described above), the monitoring apparatus 1 determines that the tracking release condition is met.

Figure 9:
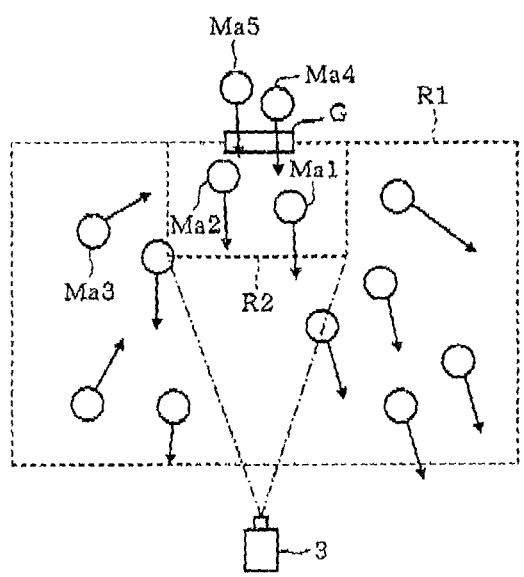
FIG. 9 is an illustration illustrating a priority monitoring area which is set in the monitoring area.

Therefore, in the monitoring process shown in FIG. 3, when determined that the tracking release condition is met (YES at A6), the monitoring apparatus 1 performs fixed-point monitoring by enlarging a priority monitoring area R2 set in advance within the monitoring area R1, as shown in FIG. 9 (A11). The priority monitoring area R2 is an area including the entrance/exit G, which is the priority monitoring target, and is set near the entrance/exit G. According to the present embodiment, the priority monitoring area R2 is approximately set to a size enabling a plurality of moving objects to be imaged at the same time. If the moving objects are presumed to be people, the priority monitoring area R2 is approximately set such that three to four people can be imaged from head to toe. The angle of view of the imaging camera 20 at this time is greater than the angle of view α and no greater than the angle of view 3. That is, in the fixed-point monitoring state, a plurality of moving objects near the entrance/exit G are captured within a single image in the image of the priority monitoring area R2. In addition, the direction of the imaging camera 20 is fixed. The imaging camera 20 does not track the movements of the moving objects. In other words, automatic tracking of the moving object is released.

As a result, even when the moving objects are concentrated at the entrance/exit G during a short period of time, the vicinity of the entrance/exit G to be preferentially monitored can be monitored. The monitoring apparatus 1 continues fixed-point monitoring until a fixed-point monitoring period, determined in advance, ends (NO at A12, then proceeds to step A11). Therefore, switching of the field of view immediately after the start of fixed-point monitoring is prevented.

In the control method according to the present embodiment, described above, the following effects are achieved.

Among the moving objects present within the monitoring area R1, the moving object closest to the priority monitoring target (the entrance/exit G, according to the present embodiment) is set as the tracking target. The camera device 3 automatically tracks the tracking target. Therefore, the moving object closest to the location to be preferentially monitored, that is, the moving object desired as a monitoring target by the observer can be set as the tracking target.

At this time, the moving object closest to the priority monitoring target is set as the tracking target. Therefore, even when the moving object moves and the positional relationship changes, the tracking target can be automatically and appropriately switched. In addition, even when a plurality of moving objects are present within the monitoring area, the tracking target is successively switched in accompaniment with the movements of the moving objects. Therefore, each of the moving objects within the monitoring area can be monitored.

When the number of times (i.e., count) that the tracking period during which the same moving object is automatically tracked continuously falls below the lower limit value reaches the lower-limit determination count or higher, that is, when the field of view of the camera device 3 frequently changes before a moving object is identified, the priority monitoring area R2 is enlarged and fixed-point monitoring is performed by the camera device 3. As a result, the field of view of the camera device 3 is fixed, and the moving object can be identified.

When the number of times that the tracking target is switched during the determination period exceeds the determination upper-limit value determined in advance, that is, when the field of view of the camera device 3 frequently changes, the priority monitoring area R2 is enlarged and fixed-point monitoring is performed by the camera device 3. As a result, the field of view of the camera device 3 is fixed, and the moving object can be identified.

At this time, the priority monitoring area R2 is set to an area including the priority monitoring target. In other words, fixed-point monitoring is performed in a state in which the priority monitoring target is within the field of view. Therefore, the risk of decrease in monitoring performance can be suppressed.

The priority monitoring area R2 is set to a size enabling a plurality of moving objects to be imaged. That is, the priority monitoring area R2 is set to a size such as to place importance on the identification of moving objects within the priority monitoring area R2. Therefore, a plurality of moving objects present near the priority monitoring area R2 can be identified even during fixed-point monitoring. As a result, the risk of decrease in identification performance can be suppressed.

The camera device 3 is provided with the zoom function. Therefore, in this case, when importance is placed on whether or not a moving object is present near the priority monitoring target, the size of the priority monitoring area can be made larger than that according to the present embodiment. That is, the size of the priority monitoring area R2 can be set as appropriate based on what the observer considers important.

[Second Embodiment]

A control method according to a second embodiment of the present invention will hereinafter be described with reference to FIG. 10 to FIG. 15. The second embodiment differs from the first embodiment regarding the moving object to be set as the tracking target when a plurality of moving objects are identified. The configuration of the monitoring apparatus is the same as that according to the first embodiment. Therefore, the monitoring apparatus is described using the same reference numbers. In addition, detailed descriptions of processes in the monitoring process shown in FIG. 10 that are the same as those in the monitoring process according to the first embodiment shown in FIG. 3 are omitted.

Figure 10:
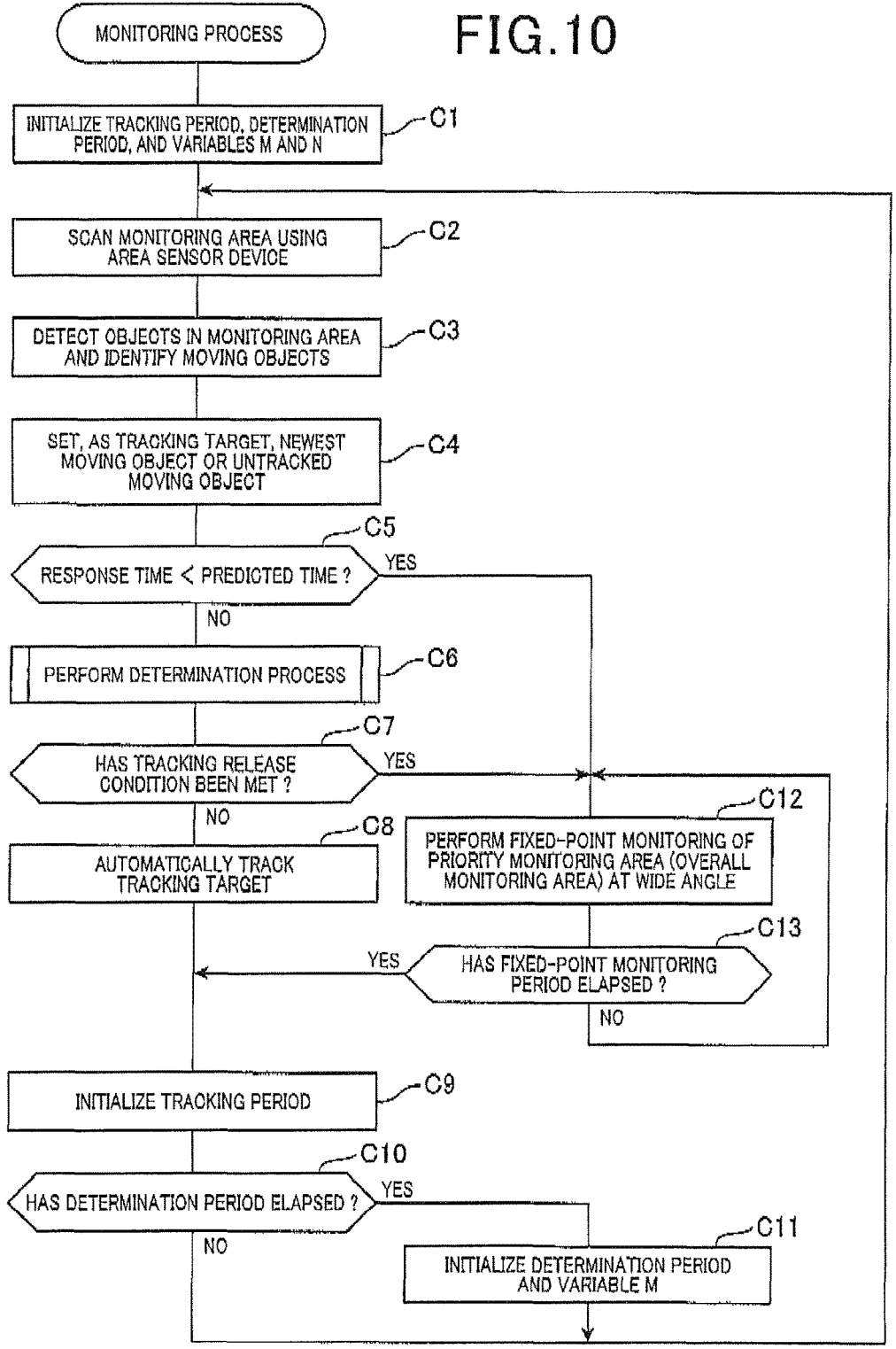

The monitoring apparatus 1 performs the monitoring process shown in FIG. 10. The monitoring apparatus 1 initializes the tracking period, the determination period, and the variables M and N (C1). Thereafter, the monitoring apparatus 1 scans the monitoring area R1 using the area sensor device 2 (C2). The monitoring apparatus 1 detects objects within the monitoring area R1 and identifies moving objects (C3). Next, the monitoring apparatus 1 sets the newest moving object or an untracked moving object as the tracking target (C4). The newest moving object herein refers to the newest identified moving object among the moving objects newly identified within the monitoring area R1. In other words, upon newly identifying a moving object within the monitoring area R1, that is, upon infiltration of a new moving object into the monitoring area R1, the monitoring apparatus 1 sets this moving object as the tracking target.

Meanwhile, the untracked moving object refers to a moving object that has not yet been set as the tracking target, among the newly identified moving objects. When a plurality of moving objects are newly identified within the monitoring area R1, the monitoring apparatus 1 is required to select and set any of the moving objects as the tracking target. When a plurality of moving objects are newly identified, the monitoring apparatus 1 according to the present embodiment preferentially sets a moving object near the border of the monitoring area R1 as the tracking target. Therefore, when a plurality of moving objects are identified at the same time, a moving object that has not been set as the tracking target is present within the monitoring area R1. Therefore, when an untracked moving object is present, the monitoring apparatus 1 sets this moving object as the tracking target.

As a result of the newest moving object or an untracked moving object being set as the tracking target in this way, each moving object that has infiltrated the monitoring area R1 can be automatically tracked.

Figure 11:
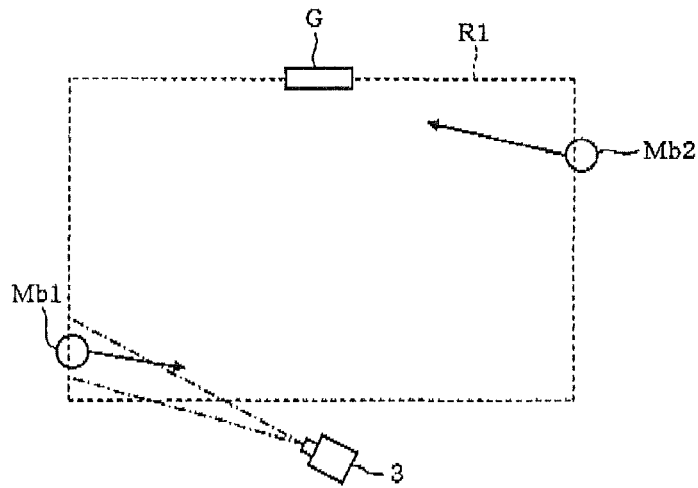
FIG. 11 is an illustration illustrating a positional relationship among moving objects in a monitoring area.

After setting the tracking target, the monitoring apparatus 1 determines whether or not the response time is longer than a predicted time (C5). Here, the response time refers to the amount of time required until the moving object newly set as the tracking target is automatically tracked. The predicted time is the predicted amount of time required for the moving object to reach the priority monitoring target (the entrance/exit G). Specifically, for example, as shown in FIG. 11, a moving object Mb1 is first identified on the left end side of the monitoring area R1 in FIG. 11. Then, in a state in which the moving object Mb1 is being automatically tracked, a moving object Mb2 is identified.

In this case, to monitor the moving object Mb2, the direction of the imaging camera 20 is required to be moved from the left end side to the right end side in FIG. 11. The zoom function is required to be controlled such that the imaging camera 20 focuses on the moving object Mb2. The moving object is then required to be identified from the captured image. The amount of time required for this operation is the response time. In addition, the predicted amount of time required for the moving object Mb2 to reach the entrance/exit G is the predicted time. The size of the monitoring area R1 and the position of the entrance/exit G are determined in advance. In addition, the distance between the moving object Mb2 and the entrance/exit G can be determined from the position information. Therefore, the response time and the predicted time can be calculated based on these pieces of information.

When determined that the response time is shorter than the predicted time (NO at C5), in a manner similar to that according to the first embodiment, the monitoring apparatus 1 performs the determination process shown in FIG. 4 (C6). When determined that the tracking release condition is not met (NO at C7), the monitoring apparatus 1 automatically tracks the tracking target (C8). Subsequently, the monitoring apparatus 1 initializes the tracking period (C9). When determined that the determination period has not elapsed (NO at C10), the monitoring apparatus 1 proceeds directly to step C2. When determined that the determination period has elapsed (YES at C10), the monitoring apparatus 1 initializes the determination period and the variable M (C11). The monitoring apparatus 1 then proceeds to step C2. The monitoring apparatus 1 repeatedly performs identification of moving objects, setting of the tracking target, the determination process, and the like.

Figure 12:
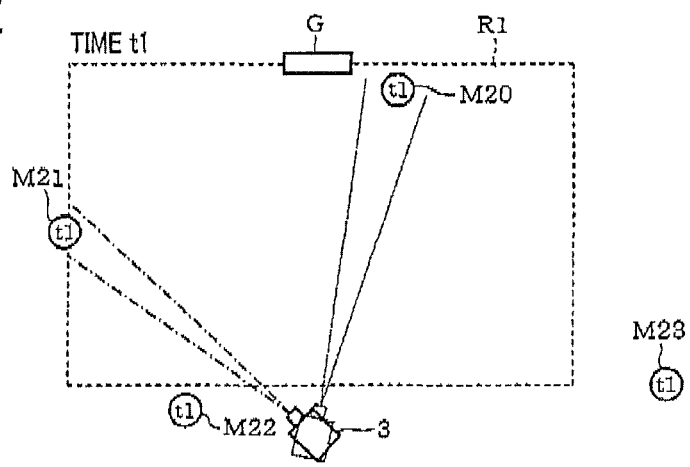
FIG. 12 is an illustration illustrating a positional relationship among the moving objects at a time instant t1.
Figure 14:
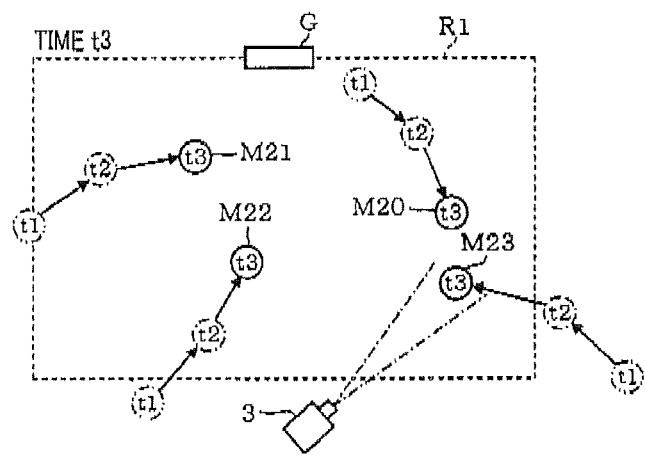
FIG. 14 is an illustration illustrating a positional relationship among the moving objects at a time instant t3.

In the control method according to the present embodiment as well, the field of view of the imaging camera 20 may be frequently switched. A reason for this is as follows. In other words, the number of imaging cameras 20 that are installed and the like are set based on the setup state of the monitoring apparatus 1, that is, the approximate number of moving objects premised. However, when a number of moving objects exceeding the premised number is present, for example, automatic tracking may be delayed. For example, as shown in FIG. 12, at time t1 at which a moving object M20 is being automatically tracked, a moving object M21 is newly identified. In this case, the monitoring apparatus 1 sets the moving object M20 as the tracking target and automatically tracks the moving object M21. Then, at time t2 as shown in FIG. 12, a moving object M22 is newly identified. The monitoring apparatus 1 sets the moving object M22 as the tracking target and automatically tracks the moving object M22. Subsequently, at time t3 as shown in FIG. 14, a moving object M23 is newly identified. The monitoring apparatus 1 sets the moving object M23 as the tracking target and automatically tracks the moving object M23.

Figure 15:
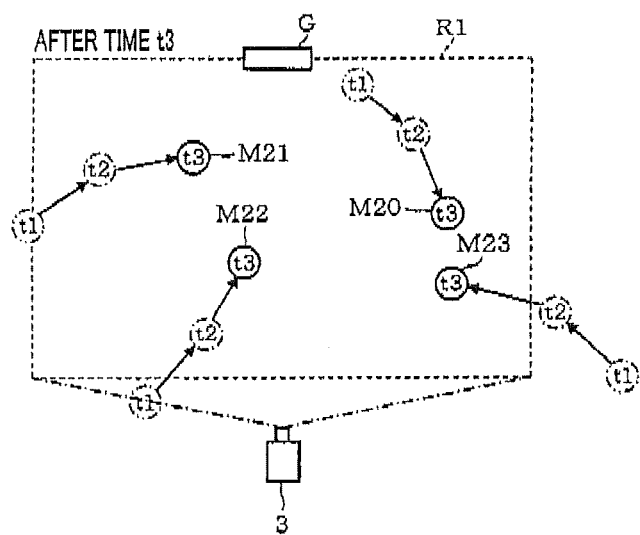
FIG. 15 is an illustration illustrating a positional relationship among the moving objects and an priority monitoring area set in the monitoring area, at a time instant t3 and thereafter.

In this case, the monitoring apparatus 1 repeats the determination process at step C6 each time the tracking target is set. Because the tracking target is switched, the monitoring apparatus 1 performs the determination based on the above-described determination criterion A and determination criterion B. Then, for example, when determined that the tracking release condition is met at time t3 shown in FIG. 14 (YES at C7), the monitoring apparatus 1 releases automatic tracking. The monitoring apparatus 1 then performs fixed-point monitoring of the priority monitoring area (the overall monitoring area R1, according to the present embodiment) at a wide angle as shown in FIG. 15 (C12). At this time, the angle of view of the imaging camera 20 is the angle of view β. In a manner similar to that according to the first embodiment, the priority monitoring area includes the entrance/exit G, which is the priority monitoring target.

As a result, the presence of moving objects throughout the overall monitoring area R1 can be grasped. In other words, even in a situation in which moving objects infiltrate the monitoring area R1 one after the other, monitoring can be performed such as to include the entrance/exit G that is to be preferentially monitored. In a manner similar to that according to the first embodiment, the monitoring apparatus 1 continues fixed-point monitoring until a fixed-point monitoring period, determined in advance, ends (NO at step C13, then proceeds to step C12).

In the control method according to the present embodiment, described above, the following effects are achieved.

Among the moving objects identified within the monitoring area R1, the newest identified moving object is set as the tracking target. The camera device 3 automatically tracks the tracking target. Therefore, a moving object that has infiltrated the monitoring area R1, that is, the moving object that the observer desires to monitor can be set as the tracking target.

In addition, because the newest identified moving object is set as the tracking target, the moving object can be set as the monitoring target at an early stage of infiltration. It is presumed that, based on statistics, a certain period of time is required for the moving object to reach a position that should actually be protected, such as the priority monitoring target. Therefore, monitoring can be performed based on many pieces of information (information acquired through imaging) using the tracking time to the fullest. Therefore, monitoring accuracy can be improved. The role as a monitoring apparatus can be sufficiently fulfilled.

When a plurality of newly identified moving objects are present, the moving objects are set as the tracking target in order from that close to the border of the monitoring area R1. The tracking target is then automatically tracked. This operation is repeatedly performed. Therefore, each moving object that has infiltrated the monitoring area R1 can be set as the tracking target.

In this case, a moving object being close to the border of the monitoring area R1 means that the moving object can easily leave the monitoring area R1. Therefore, as a result of the moving object close to the border of the monitoring area R1 being set as the tracking target when a plurality of moving objects are identified, a moving object that may move outside of the monitoring area R1 can be preferentially monitored. As a result, even when a plurality of moving objects are identified at the same time, a situation in which a moving object that has infiltrated the monitoring area R1 leaves the monitoring area R1 without being monitored can be prevented.

When the response time is longer than the predicted time, fixed-point monitoring of the priority monitoring area is performed at a wide angle by the camera device 3. Therefore, even when automatic tracking is delayed, at least the moving objects can be imaged.

When the number of times that the tracking period during which the same moving object is automatically tracked continuously falls below the lower limit value reaches the lower-limit determination count or higher, the priority monitoring area R2 is enlarged and fixed-point monitoring is performed by the camera device 3. Therefore, in a manner similar to that according to the first embodiment, the field of view of the camera device 3 is fixed, and the moving objects can be identified.

When the number of times that the tracking target is switched during the determination period exceeds the determination upper-limit count determined in advance, the priority monitoring area R2 is enlarged and fixed-point monitoring is performed by the camera device 3. Therefore, in a manner similar to that according to the first embodiment, the field of view of the camera device 3 is fixed, and the moving objects can be identified.

Because the priority monitoring area R2 is set to the overall monitoring area R1, the overall monitoring area R1 can be monitored even during fixed-point monitoring. The risk of decrease in monitoring performance can be suppressed.

[Third Embodiment]

A control method according to a third embodiment of the present invention will hereinafter be described with reference to FIG. 16 and FIG. 17. The third embodiment differs from the second embodiment in that, when fixed-point monitoring is performed at a wide angle, a desired moving object can be selected. Regarding the configuration of the monitoring apparatus, sections that are the same as those according to the first embodiment are described using the same reference numbers. In addition, detailed descriptions of processes in the monitoring process shown in FIG. 17 that are the same as those in the monitoring process according to the second embodiment shown in FIG. 10 are omitted.

Figure 16:
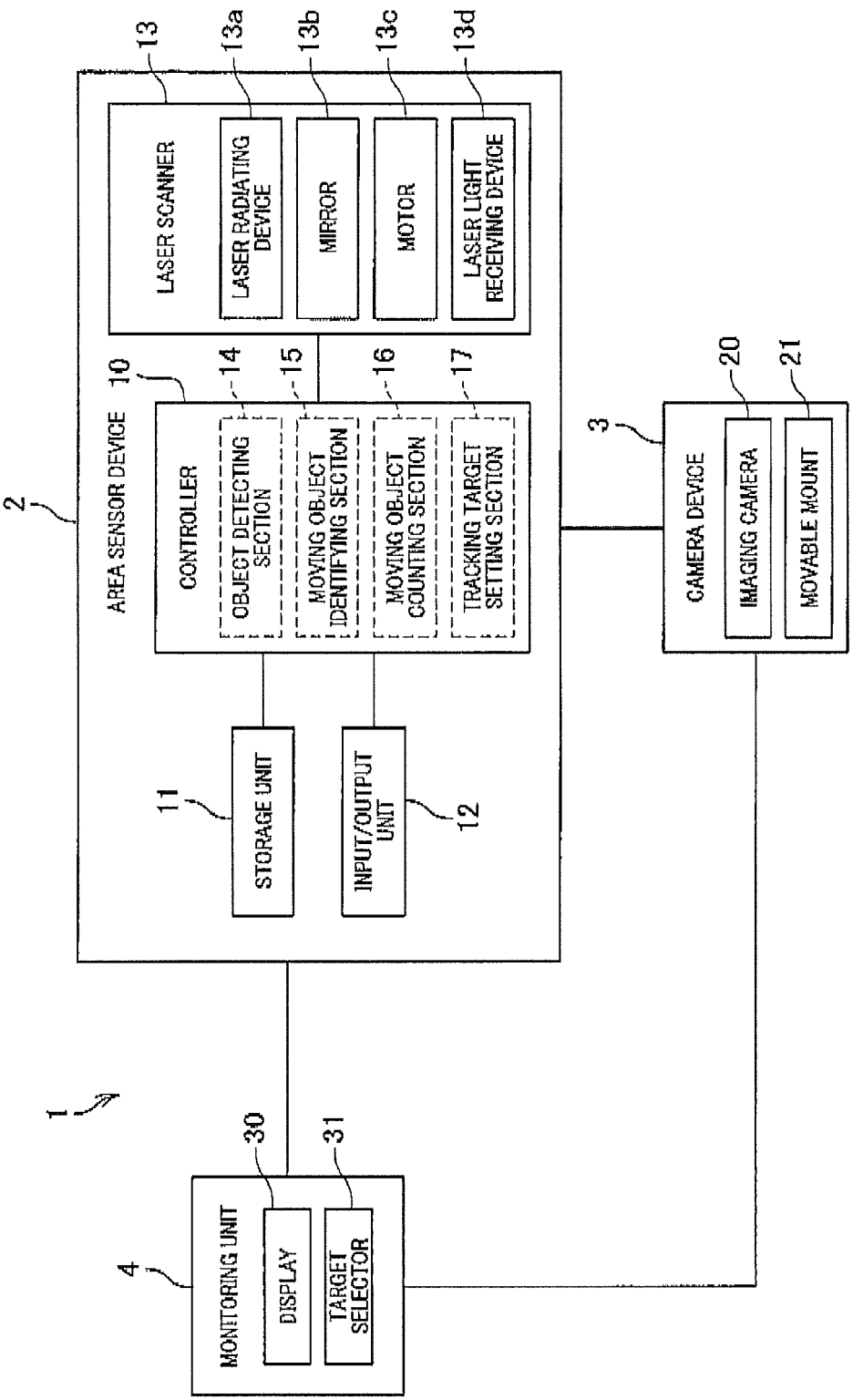
FIG. 16 is a block diagram illustrating the configuration of a monitoring apparatus according to a third embodiment.

As shown in FIG. 16, in the monitoring apparatus 1 according to the present embodiment, the monitoring unit 4 is provided with a target selector 31. The target selector 31 is used to select any of the moving objects, among the moving objects present within the monitoring area R1, as the tracking target. The target selector 31 is configured as an input means, such as a mouse, a keyboard, or a touch panel, (not shown) in which a selection operation by the security guard or the like is inputted. Selection of the tracking target is performed by the desired moving object being selected from among the moving objects displayed in the display 30 (image from the imaging camera 20). A process for selecting the tracking target will be described below.

Figure 17:
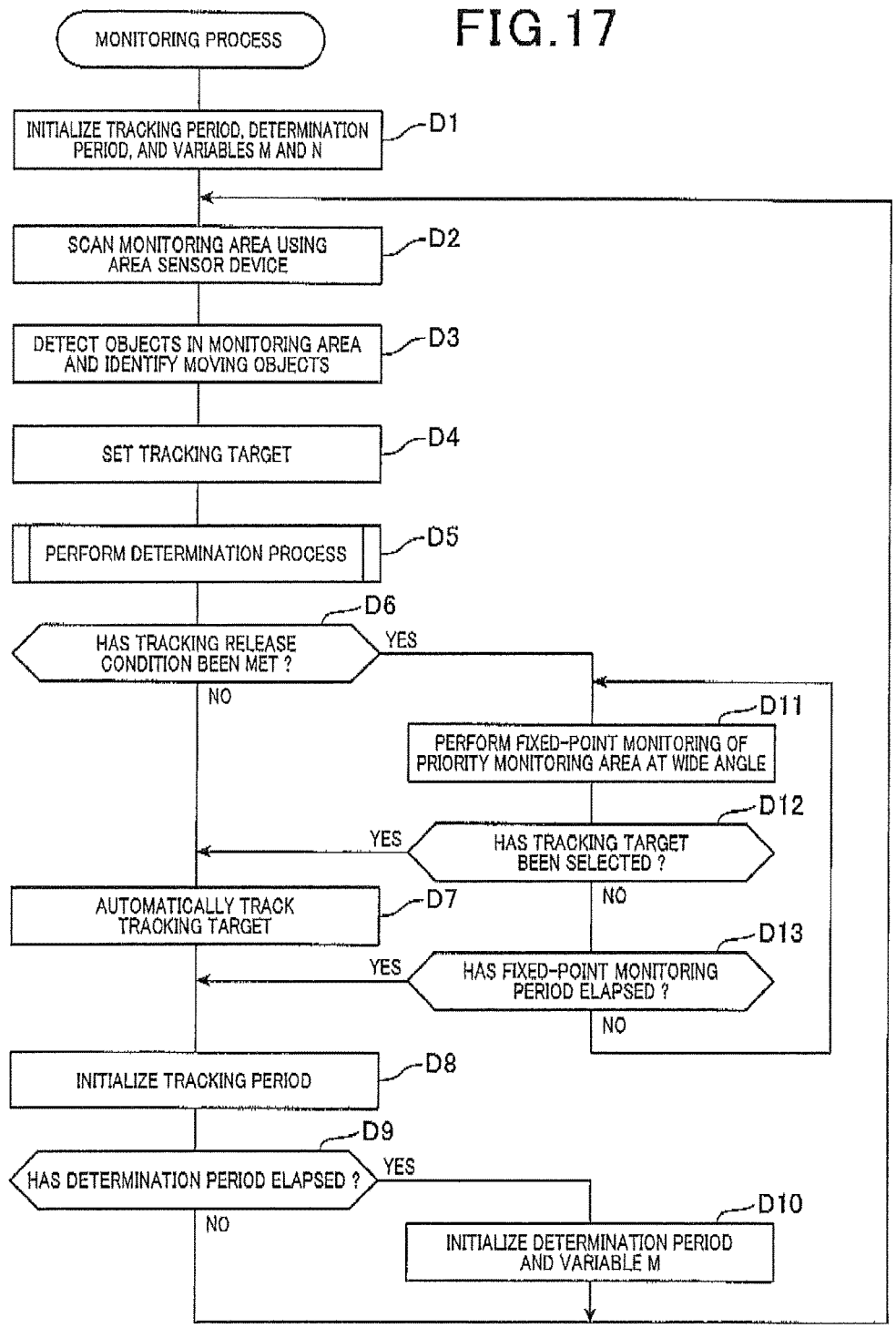
FIG. 17 is a flowchart showing a monitoring process performed by the monitoring apparatus.

The monitoring apparatus 1 performs a monitoring process shown in FIG. 17. The monitoring apparatus 1 initializes the tracking period, the determination period, and the variables M and N (D1). Thereafter, the monitoring apparatus 1 scans the monitoring area R1 using the area sensor device 2 (D2). The monitoring apparatus 1 detects objects within the monitoring area R1 and identifies moving objects (D3). Next, the monitoring apparatus 1 sets the tracking target (D4). Here, the monitoring apparatus 1 may set the moving object closest to the entrance/exit G as the tracking target, as according to the first embodiment. Alternatively, the monitoring apparatus 1 may set the newest moving object as the tracking target, as according to the second embodiment. The monitoring apparatus 1 may also set the moving objects within the monitoring area R1 in sequence or in a random manner.

Next, in a manner similar to that according to the first embodiment, the monitoring apparatus 1 performs the determination process shown in FIG. 4 (D5). When determined that the tracking release condition is not met (NO at D6), the monitoring apparatus 1 automatically tracks the tracking target (D7). Subsequently, the monitoring apparatus 1 initializes the tracking period (D8). When determined that the determination period has not elapsed (NO at D9), the monitoring apparatus 1 proceeds directly to step D2. When determined that the determination period has elapsed (YES at D9), the monitoring apparatus 1 initializes the determination period and the variable M (D10). The monitoring apparatus 1 then proceeds to step D2.

Figure 13:
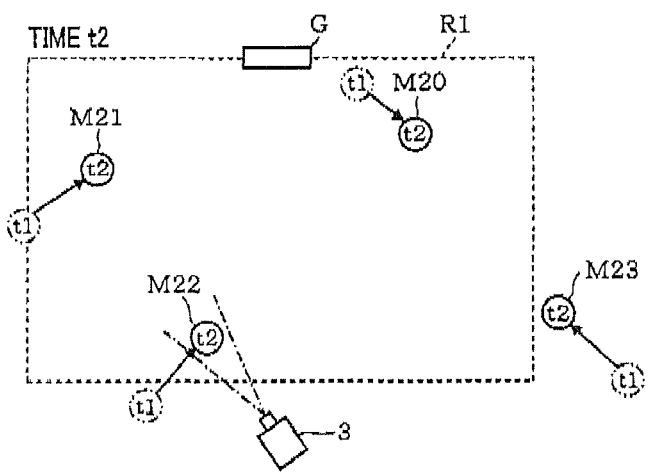
FIG. 13 is an illustration illustrating a positional relationship among the moving objects at a time instant t2.

The monitoring apparatus 1 repeatedly performs identification of the moving objects and the determination process, such as shown in FIG. 12 to FIG. 14 according to the second embodiment. When determined that the tracking release condition is met (YES at D6), the monitoring apparatus 1 performs fixed-point monitoring of the priority monitoring area at a wide angle, as shown in FIG. 15 (D11).

According to the present embodiment, the monitoring apparatus 1 sets the overall monitoring area R1 as the priority monitoring area, in a manner similar to that according to the second embodiment.

Next, the monitoring apparatus 1 determines whether or not the tracking target is selected (D12). In this case, for example, when the target selector 31 is configured by a touch panel, the desired moving object can be selected by any of the moving objects displayed in the display 30 being selected by touch operation. Alternatively, moving object identifiers (IDs) (unique numbers assigned when the area sensor device 2 identifies the moving objects) may be displayed in the display 30. The desired moving object ID may be selected using a keyboard or the like. In any case, any configuration is possible as long as the moving object can be selected.

When determined that the tracking target is selected (YES at D12), the monitoring apparatus 1 automatically tracks the selected tracking target (D7). At this time, fixed-point monitoring is released. Meanwhile, when determined that the tracking target is not selected (NO at D12), the monitoring apparatus 1 continues fixed-point monitoring until the fixed-point monitoring period ends (NO at D13, then proceeds to step D11).

In this way, even when a plurality of moving objects are present in the monitoring area R1, the monitoring apparatus 1 can set the moving object desired by the observer as the tracking target.

In the control method according to the present embodiment described above, the following effects are achieved.

When a plurality of moving objects are identified within the monitoring area R1, fixed-point monitoring of the priority monitoring area R2 is performed at wide angle by the camera device 3 when the tracking release condition is met. Therefore, the moving objects within the priority monitoring area R2 can be imaged. As a result, even when a plurality of moving objects infiltrate the monitoring area R1, at least the moving objects within the priority monitoring area R2 can be monitored.

In this case, as a result of the field of view being set to a wide angle, moving objects having positional relationships that may cause the field of view to be switched are collectively included in the field of view. Therefore, the same image is captured over a long period of time, thereby facilitating differentiation of relevant moving objects.

When the number of times that the tracking period during which the same moving object is automatically tracked continuously falls below the lower limit value reaches the lower-limit determination count or higher, the priority monitoring area R2 is enlarged and fixed-point monitoring is performed by the camera device 3. Therefore, in a manner similar to that according to the first embodiment, the field of view of the camera device 3 is fixed, and the situation within the monitoring area can be completely grasped. For example, the state of movement of the moving objects, the amount of objects present within the monitoring area, and the like can be grasped. In addition, because fixed-point monitoring is performed in a state in which the priority monitoring target is included in the field of view, the risk of decrease in monitoring performance can be suppressed.

When the number of times that the tracking target is switched during the determination period exceeds the determination upper-limit determined in advance, the priority monitoring area R2 is enlarged and fixed-point monitoring is performed by the camera device 3. Therefore, in a manner similar to that according to the first embodiment, the field of view of the camera device 3 is fixed, and the situation within the monitoring area can be completely grasped.

Because the priority monitoring area R2 is set to the overall monitoring area R1, the overall monitoring area R1 can be monitored even during fixed-point monitoring. The risk of decrease in monitoring performance can be suppressed.

The target selector 31 is provided to allow selection of the moving object to be set as the tracking target. Therefore, the moving object desired by the observer can be set as the tracking target with certainty.

[Fourth Embodiment]

A control method according a fourth embodiment of the present invention will hereinafter be described with reference to FIG. 18. The fourth embodiment differs from the first embodiment in terms of the mode for setting the tracking target. The configuration of the monitoring apparatus 1 is the same as that according to the first embodiment. Therefore, the description will be given with reference also to FIG. 1. Detailed descriptions of the processes in the monitoring process shown in FIG. 18 that are the same as those in the monitoring process according to the first embodiment shown in FIG. 3 will be omitted.

Figure 18:
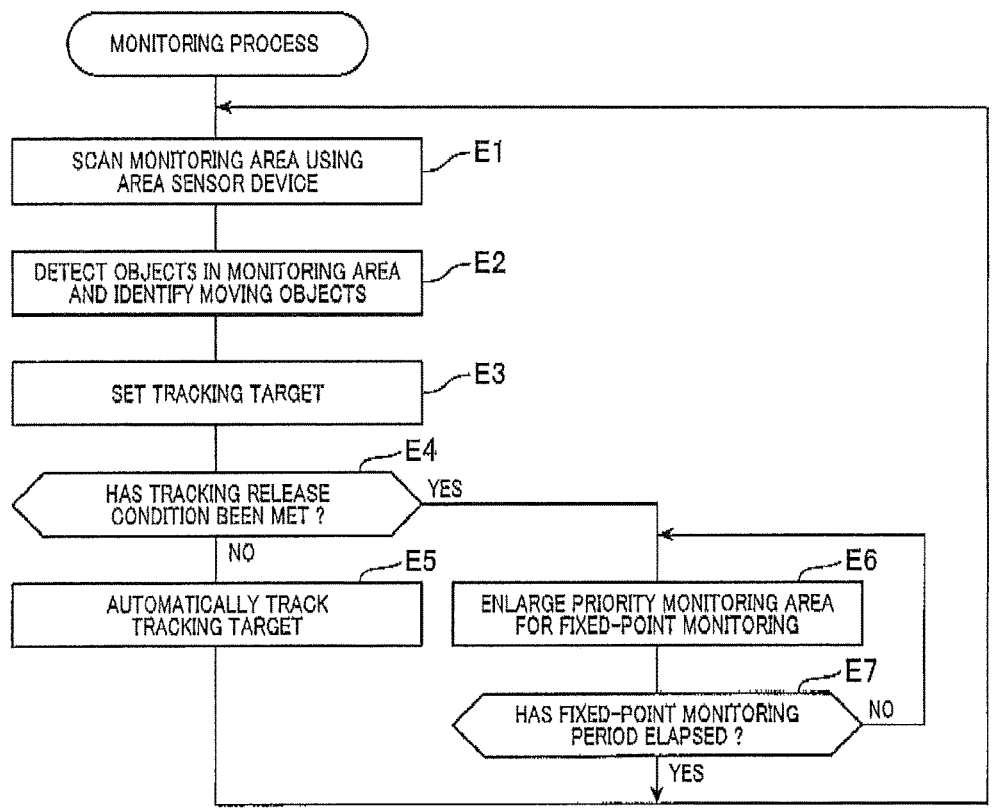
FIG. 18 is a flowchart showing a monitoring process performed by a monitoring apparatus according to a fourth embodiment.

The monitoring apparatus 1 performs a monitoring process shown in FIG. 18. The monitoring apparatus 1 scans the monitoring area R1 using the area sensor device 2 (E1). The monitoring apparatus 1 detects objects within the monitoring area R1 and identifies moving objects (E2). The monitoring apparatus 1 then sets a tracking target (E3). Here, the monitoring apparatus 1 may set the moving object closest to the entrance/exit G as the tracking target, as according to the first embodiment. Alternatively, the monitoring apparatus 1 may set the newest moving object as the tracking target, as according to the second embodiment. The monitoring apparatus 1 may also set the moving objects within the monitoring area R1 in sequence or in a random manner.

Next, the monitoring apparatus 1 determines whether or not a tracking release condition is met (E4). According to the present embodiment, in addition to the above-described determination criterion A and determination criterion B, the following determination criteria is, set as the tracking release condition.

Determination criterion C: The response time required until a moving object newly set as the tracking target is automatically tracked is longer than the predicted time required for the moving object newly set as the tracking target to reach the priority monitoring target.

Determination criterion D: The number of identified moving objects exceeds a moving object upper-limit count determined in advance. The moving object upper-limit count can be set based on the size of the monitoring area R1 and the like. For example, the following can be considered. When it is presumed that the moving object is a person, the amount of time required for the person to cross the monitoring area R1 is premised in advance based on the size of the monitoring area R1 and the walking speed of the person. The moving object upper-limit count is then set based on the premised amount of time and the minimum amount of time required for a single automatic tracking operation.

Determination criterion E: A period during which the priority monitoring target or the priority monitoring area R2 is not monitored exceeds an unmonitored upper-limit value set in advance.

When any of the above-described determination criteria A to E is met, the monitoring apparatus 1 determines that the tracking release condition is met. Processes for the determination criterion A and the determination criterion B are the same as those in the determination process shown in FIG. 4 according to the first embodiment. The process for the determination criterion C is the same as the process at step C5 according to the second embodiment. Detailed descriptions thereof are omitted. In FIG. 18, the process in which the tracking period, the determination period, and the variables M and N are initialized is omitted.

With regard to the determination criterion D, when the number of moving objects identified within the monitoring area R1 exceeds the moving object upper-limit count, the monitoring apparatus 1 considers the tracking release condition met and releases automatic tracking. A reason for this is that, when the moving object upper-limit count is exceeded, it can be expected that frequent switching of the field of view is a certainty. The process for the determination criterion D may be performed upon identification of the moving objects, that is, after step E2 and before step E3.

With regard to the determination criterion E, when the period during which the priority monitoring target or the priority monitoring area R2 is not monitored exceeds the unmonitored upper-limit value set in advance, the monitoring apparatus 1 considers the tracking release condition met and releases automatic tracking. For example, when a new moving object is automatically tracked as according to the second embodiment, the tracking target is switched to a new moving object when a new moving object is identified. Therefore, even when a moving object that has been identified earlier infiltrates the priority monitoring area R2, the moving object is not a tracking target. Therefore, the moving object positioned near the priority monitoring area R2 is not monitored. In addition, when a new moving object moves without approaching the priority monitoring area R2 (that is, the priority monitoring target) as well, the period over which the priority monitoring area R2 is not monitored becomes long. Therefore, when the unmonitored upper-limit value is exceeded, the priority monitoring area R2 is temporarily monitored. As a result, the period over which the priority monitoring area R2 is not monitored can be prevented from becoming long.

The monitoring apparatus 1 determines whether or not the tracking release condition is met based on the above-described determination criteria. When determined that the tracking release condition is not met (NO at E4), the monitoring apparatus 1 automatically tracks the tracking target (E5). The monitoring apparatus 1 then proceeds to step E1, and repeatedly performs the processes to detect objects, identify moving objects, and set the tracking target.

Meanwhile, when determined that the tracking release condition is met (NO at E4), the monitoring apparatus 1 enlarges the priority monitoring area R2 as shown in FIG. 9 according to the first embodiment and performs fixed-point monitoring (E6). The monitoring apparatus 1 continues fixed-point monitoring until the fixed-point monitoring period ends (NO at E7, then proceeds to step E1).

In this way, when determined that the tracking release condition is met, the monitoring apparatus 1 enlarges the priority monitoring area R2 and performs fixed-point monitoring. Therefore, even when a plurality of moving objects are present within the monitoring area R1, the vicinity of the entrance/exit G that should preferentially be monitored can be monitored.

In the control method according to the present embodiment described above, the following effects are achieved.

When a plurality of moving objects are identified within the monitoring area R1, the priority monitoring area is enlarged and fixed-point monitoring is performed by the camera device 3 when the tracking release condition is met. Therefore, the moving objects present near the priority monitoring target can be identified. Decrease in monitoring performance in an area to be preferentially monitored can be prevented.

In addition, the inside of the priority monitoring area R2 is enlarged and imaged. Therefore, the moving objects within the so priority monitoring area R2 can be imaged in an identifiable manner. As a result, even when a plurality of moving objects infiltrate the monitoring area R1, at least the moving objects within the priority monitoring area R2 desired by the observer can be monitored.

When the number of times that the tracking period during which the same moving object is automatically tracked continuously falls below the lower limit value reaches the lower-limit determination count or higher, that is, when the field of view of the camera device 3 is frequently switched before the moving objects are identified, the priority monitoring area R2 is enlarged and fixed-point monitoring is performed by the camera device 3. As a result, the field of view of the camera device 3 is fixed and the moving objects can be identified.

When the number of times that the tracking target is switched during the determination period exceeds the determination upper-limit determined in advance, that is, when the field of view of the camera device 3 is frequently switched, the priority monitoring area R2 is enlarged and fixed-point monitoring is performed by the camera device 3. As a result, the field of view of the camera device 3 is fixed and the moving objects can be identified.

When the response time is longer than the predicted time, the priority monitoring area R2 Is enlarged and fixed-point monitoring is performed by the camera device 3. Therefore, even in a situation in which automatic tracking is delayed, in a manner similar to that according to the first embodiment, at least the moving objects positioned in a location to be preferentially monitored can be imaged.

When the number of moving objects present in the monitoring area R1 exceeds the moving object upper-limit count, the priority monitoring area R2 is enlarged and fixed-point monitoring is performed by the camera device 3. Therefore, even in a situation in which automatic tracking is delayed, in a manner similar to that according to the first embodiment, at least the moving objects positioned in a location to be preferentially monitored can be imaged.

When the period over which the priority monitoring area R2 is not monitored exceeds the unmonitored upper-limit value, the priority monitoring area R2 is enlarged and fixed-point monitoring is performed by the camera device 3. Therefore, a situation in which the period over which the priority monitoring target or the priority monitoring area R2 is not monitored becomes long and the monitoring state deteriorates can be prevented. As a result, for example, when an object that is in a stationary state (if the object is a person, the stationary state includes when the person is moving his/her hands, for example, but is not moving position) within the monitoring area R1 and is temporarily eliminated from the tracking target as being "not a moving object" is present near the priority monitoring target or the priority monitoring area R1, the priority monitoring target or the priority monitoring area R2 can be monitored.

[Other Embodiments]

The present invention is not limited to the examples according to the embodiments. For example, the present invention can be modified or expanded as below.

The numerical values given according to the embodiments are examples. The present invention is not limited thereto.

When objects are detected, the objects may be detected and the moving objects may be identified based on data obtained from a plurality of scanning operations rather than a single scanning operation.

To simplify the description, a process flow in which the monitoring apparatus 1 stands by during the fixed-point monitoring period is given as an example according to the embodiments. However, the monitoring apparatus 1 performs detection of objects and identification of moving objects even during the fixed-point monitoring period. When the fixed-point monitoring period elapses, the monitoring apparatus 1 automatically tracks the moving objects identified during the fixed-point monitoring period.

When confirmation by the observer is required, the same moving object is required to be continuously imaged for about two seconds. However, when the monitoring unit 4 is configured to be provided with a storage unit and capable of reproducing captured images, the period over which the same moving object is imaged can be shortened. The moving object can be confirmed at a later time. Therefore, the response time and the tracking period can be set as appropriate based on the configuration of the monitoring apparatus 1 and the like.

The determination criteria A to E may be combined in any manner. That is, the determination criteria A and B are used according to the first embodiment. However, the determination criteria C to E may be used. Alternatively, the determination criterion D may be used, and fixed-point monitoring may be performed when the number of moving objects is large. The determination criteria A to E may also be similarly combined in any manner for the second embodiment and the third embodiment.

According to the embodiments, the moving objects identified within the monitoring area include moving objects that have stopped within the monitoring area and have temporarily been determined to be "not a moving object", but have subsequently resumed movement.

REFERENCE SIGN LIST

In the drawings, a reference number 1 shows a monitoring apparatus, a reference 2 shows an area sensor device (optical distance meter), and a reference number 3 shows a camera device.

The invention claimed is:

1. A method of monitoring a moving object within a predetermined monitoring area, the method comprising:
   repeatedly detecting objects every predetermined determination period of time for monitoring objects in the monitoring area by scanning the monitoring area with use of an optical distance meter;
   identifying the moving objects among the detected objects in each of the determination periods;
   setting, as a tracking target, among the identified moving objects, a moving object which is present in the monitoring area and which is newest identified, wherein the tracking target is tried to be repeatedly set in each of the determination periods;
   automatically tracking the moving object which has been set as the tracking target, with use of a camera device every time the tracking target is set, wherein, when there are present a plurality of moving objects which are identified as being the newest, the tracking target is set in an order of starting from a moving object located the nearest to a border of the monitoring area, and the identified tracking target is automatically tracked, the setting and the automatically tracking being repeated for all the identified moving objects;
   determining whether or not a plurality of the moving objects are identified in the monitoring area;
   determining whether or not a predetermined tracking release condition, which is set for releasing the automatic tracking using the camera device has been met when it is determined that the plurality of the moving objects are identified in the monitoring area; and
   enlarging and monitoring, in fixed-point monitoring, preset priority monitoring areas including the priority monitoring object present in the monitoring area with use of the camera device, when it is determined that the tracking release condition is met.

2. The method of claim 1, wherein the tracking release condition is set such that a count showing that a tracking period becomes lower successively than a lower limit value becomes larger than a lower determination value, the same moving object being automatically tracked during the tracking period.

3. The method of claim 1, wherein, the tracking release condition is set such that a count showing that the tracking target has been switched to other tracking targets in a predetermined determination period has exceeded a predetermined upper determination value.

4. The method of claim 1, wherein the tracking release condition is set such that a response time required to automatically track a moving object newly set as a tracking target is longer than a predicted time necessary for the newly set moving object to reach the priority monitoring object.

5. The method of claim 1, wherein the tracking release condition is set such that the number of identified moving objects exceeds a predetermined upper number.

6. The method of claim 1, wherein the tracking release condition is set such a period of time during which the priority monitoring object or the priority monitoring area is not continuously monitored is over a predetermined upper limit.

7. The method of claim 1, wherein the priority monitoring area is set as an area in which, at least, a plurality of the moving objects are able to be imaged.

8. An apparatus for monitoring a moving object within a predetermined monitoring area, the apparatus comprising:
   an optical distance meter;
   a camera device; and
   a controller configured to:
      repeatedly detect objects every predetermined determination period of time for monitoring objects in the monitoring area by scanning the monitoring area with use of the optical distance meter,
      identify the moving objects among the detected objects in each of the determination periods,
      set, as a tracking target, among the identified moving objects, a moving object which is present in the monitoring area and which is newest identified, wherein the tracking target is tried to be repeatedly set in each of the determination periods,
      automatically track the moving object which has been set as the tracking target, with use of the camera device every time the tracking target is set, wherein, when there are present a plurality of moving objects which are identified as being the newest, the tracking target is set in an order of starting from a moving object located the nearest to a border of the monitoring area, and the identified tracking target is automatically tracked, the setting and the automatically tracking being repeated for all the identified moving objects, determine whether or not a plurality of the moving objects are identified in the monitoring area, determine whether or not a predetermined tracking release condition, which is set for releasing the automatic tracking using the camera device has been met when it is determined that the plurality of the moving objects are identified in the monitoring area, and enlarge and monitor, in fixed-point monitoring, preset priority monitoring areas including the priority monitoring object present in the monitoring area with use of the camera device, when it is determined that the tracking release condition is met.

* * * * *